(12) United States Patent
Johannsen et al.

(10) Patent No.: US 8,146,925 B2
(45) Date of Patent: Apr. 3, 2012

(54) FACE SEAL BREAK-IN COMPOUND

(75) Inventors: Donald Orville Johannsen, Dubuque, IA (US); Timothy Bernard French, Dubuque, IA (US); Megan Emley Weston, Dubuque, IA (US)

(73) Assignee: Deere & Company, Moline, IL (US)

( * ) Notice: Subject to any disclaimer, the term of this patent is extended or adjusted under 35 U.S.C. 154(b) by 288 days.

(21) Appl. No.: 12/240,162

(22) Filed: Sep. 29, 2008

(65) Prior Publication Data
US 2010/0078896 A1 Apr. 1, 2010

(51) Int. Cl.
*F16J 15/34* (2006.01)
*C10M 105/02* (2006.01)
(52) U.S. Cl. ............. 280/1; 277/358; 508/110; 508/322
(58) Field of Classification Search ...... 280/1; 277/358; 508/334, 563, 364, 584, 110, 322
See application file for complete search history.

(56) References Cited

U.S. PATENT DOCUMENTS

| | | | |
|---|---|---|---|
| 4,351,533 A | 9/1982 | Moore | |
| 4,788,362 A * | 11/1988 | Kaneko | 585/10 |
| 6,047,969 A * | 4/2000 | Hoefft et al. | 277/370 |
| 6,096,691 A * | 8/2000 | Conary et al. | 508/189 |
| 2004/0186238 A1* | 9/2004 | Duyck et al. | 525/302 |
| 2007/0197405 A1* | 8/2007 | Holmes et al. | 508/110 |

OTHER PUBLICATIONS

Caterpillar Precision Seals, "Metal Face Seals" pamphlet, pp. 1-30, http://www.cat.com/cda/components/securedFile/displaySecuredFileServletJSP?fileId=91334&languageId=7.
ASTM International, "Standard Specification for Performance of Rear Axle Gear Lubricants Intended for API Category GL-5 Service", Designation: D 7450-08, pp. 1-4.
ASTM International, "Standard Test Method for Evaluation of Load-Carrying Capacity of Lubricants Under Conditions of Low Speed and High Torque Used for Final Hypoid Drive Axles", Designation: D 6121-08, pp. 1-18.
Figure 38, "Recommendation for Compartments Requiring Extreme Pressure Gear Oil—Also Applies to Track and Idler Roller Applications", JDS-G135, 1 page.
Maintenance-Machine, one page description of Engine Oil and Track Rollers, Front Idler and Carrier Roller Oil.
MatWeb Material Property Data, ExxonMobile 80W-90 Mobilube HD LS, http://www.matweb.com/search/DataSheet.aspx?bassnum=WEXXON055, Aug. 13, 2008, pp. 1-2.
MatWeb Material Property Data, "Chevron Texaco RPM® SAE 80W-90 Universal Gear Lubricant", http://www.matweb.com/search/DataSheet.aspx?bassnum=WCHEV219&ckck=1, Aug. 13, 2008, pp. 1-2.
John Deere Standards, "Specification for Gear Lubricants", JDM J11, Deere & Company, Rev. Nov. 24, 2004, pp. 1-3.

(Continued)

*Primary Examiner* — Tony H. Winner
*Assistant Examiner* — Jacob Knutson
(74) *Attorney, Agent, or Firm* — Faegre Baker Daniels

(57) ABSTRACT

The present disclosure provides a vehicle assembly, such as a metal face seal, that includes a break-in lubricant compound. The assembly lubricant compound may reduce friction and scoring between contacting surfaces of the assembly, especially during the initial break-in of the assembly. During the initial break-in period, the compound may permit the contacting surfaces of the assembly to seat, or establish a pattern of surface mating, with limited wear and with limited material transfer or scoring.

23 Claims, 2 Drawing Sheets

OTHER PUBLICATIONS

John Deere Waterloo Standard, "Lubricant", JDT 307, Deere & Company, 1 page.

Northland, "Material Safety Data Sheet", MSDS# NOR190, Rev. Sep. 10, 2007, pp. 1-4.

Northland, "Material Safety Data Sheet", Rev. Jun. 17, 2008, MSDS# 67A4, pp. 1-4.

John Deere, "Oil Sales Guide", Revised, pp. 1-54.

\* cited by examiner

FACE SEAL BREAK-IN COMPOUND

BACKGROUND

1. Field of the Disclosure

The present disclosure relates to a vehicle assembly. More particularly, the present disclosure relates to a vehicle assembly, such as a metal face seal, that includes a break-in lubricant compound.

2. Description of the Related Art

Undercarriage assemblies of utility vehicles, such as motor graders, are typically subjected to adverse working conditions and significant loads. For example, metal face seal assemblies used on motor graders may be subjected to extreme temperatures and significant axle loads. Beginning with the initial break-in of the vehicle and throughout the life of the vehicle, these undercarriage assemblies may suffer significant wear. Lubricant compounds may be provided to reduce the wear suffered by the undercarriage assemblies.

SUMMARY

The present disclosure provides a vehicle assembly, such as a metal face seal, that includes a break-in lubricant compound. The assembly lubricant compound may reduce friction and scoring between contacting surfaces of the assembly, such as metallic sealing rings of the metal face seal, especially during the initial break-in of the assembly. During the initial break-in period, the compound may permit the contacting surfaces of the assembly to seat, or establish a pattern of surface mating, with limited wear and with limited material transfer or scoring.

According to an embodiment of the present disclosure, a metal face seal is provided that includes a first metallic sealing ring having a first contact surface and a second metallic sealing ring having a second contact surface, the second contact surface of the second metallic sealing ring configured to contact the first contact surface of the first metallic sealing ring. The metal face seal also includes a lubricant compound located between the first metallic sealing ring and the second metallic sealing ring. The lubricant compound includes less than 20% by weight of a base oil, more than 5% by weight of a GL-5 additive, and a viscosity index modifier.

According to another embodiment of the present disclosure, a vehicle is provided that includes a chassis, at least one ground engaging mechanism configured to support and propel the chassis, an axle configured to drive the at least one ground engaging mechanism, a housing coupled to the chassis, and a metal face seal positioned between the axle and the housing. The metal face seal includes a first metallic sealing ring having a first contact surface and a second metallic sealing ring having a second contact surface, the second contact surface of the second metallic sealing ring configured to contact the first contact surface of the first metallic sealing ring. The metal face seal also includes a lubricant compound located between the first metallic sealing ring and the second metallic sealing ring. The lubricant compound includes less than 20% by weight of a base oil, more than 5% by weight of a GL-5 additive, and a viscosity index modifier.

According to yet another embodiment of the present disclosure, an assembly lubricant compound is provided that includes less than 20% by weight of a base oil, more than 5% by weight of a GL-5 additive, and a viscosity index modifier.

BRIEF DESCRIPTION OF THE DRAWINGS

The above-mentioned and other features of this disclosure, and the manner of attaining them, will become more apparent by reference to the following description of embodiments of the disclosure taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
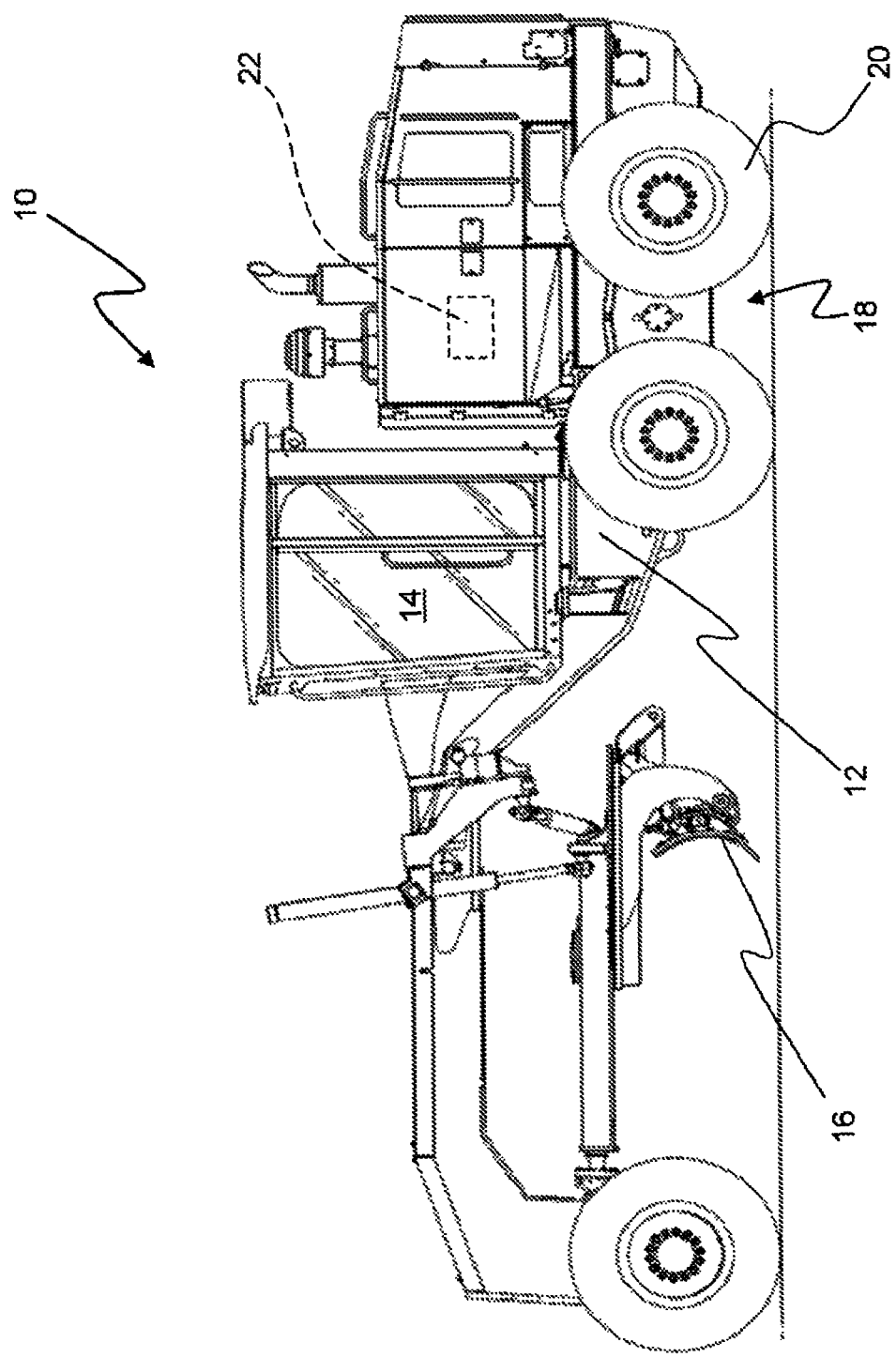
FIG. 1 is an elevational view of a motor grader having a drive assembly.

FIG. 1 provides an illustrative vehicle in the form of motor grader 10. Although the vehicle is illustrated and described herein as motor grader 10, vehicles of the present disclosure may include, for example, a bulldozer, an excavator, or another vehicle.

Motor grader 10 includes chassis 12. Chassis 12 supports operator station 14 and blade 16. Operator station 14 provides a location for a user to operate motor grader 10. Blade 16 is provided for pushing, spreading, and leveling soil and other material.

Motor grader 10 also includes drive assembly 18. Drive assembly 18 includes at least one ground engaging mechanism 20. Ground engaging mechanism 20 is configured to support and/or propel chassis 12. Drive assembly 18 is coupled to motor 22 to drive ground engaging mechanism 20 and, in turn, propel chassis 12 across the ground. Ground engaging mechanisms 20 may include wheels, as shown in FIG. 1, or tracks, for example. Drive assembly 18 may be a tandem assembly, such as the tandem assembly disclosed in U.S. Pat. No. 4,535,860, the disclosure of which is expressly incorporated herein by reference.

Figure 2:
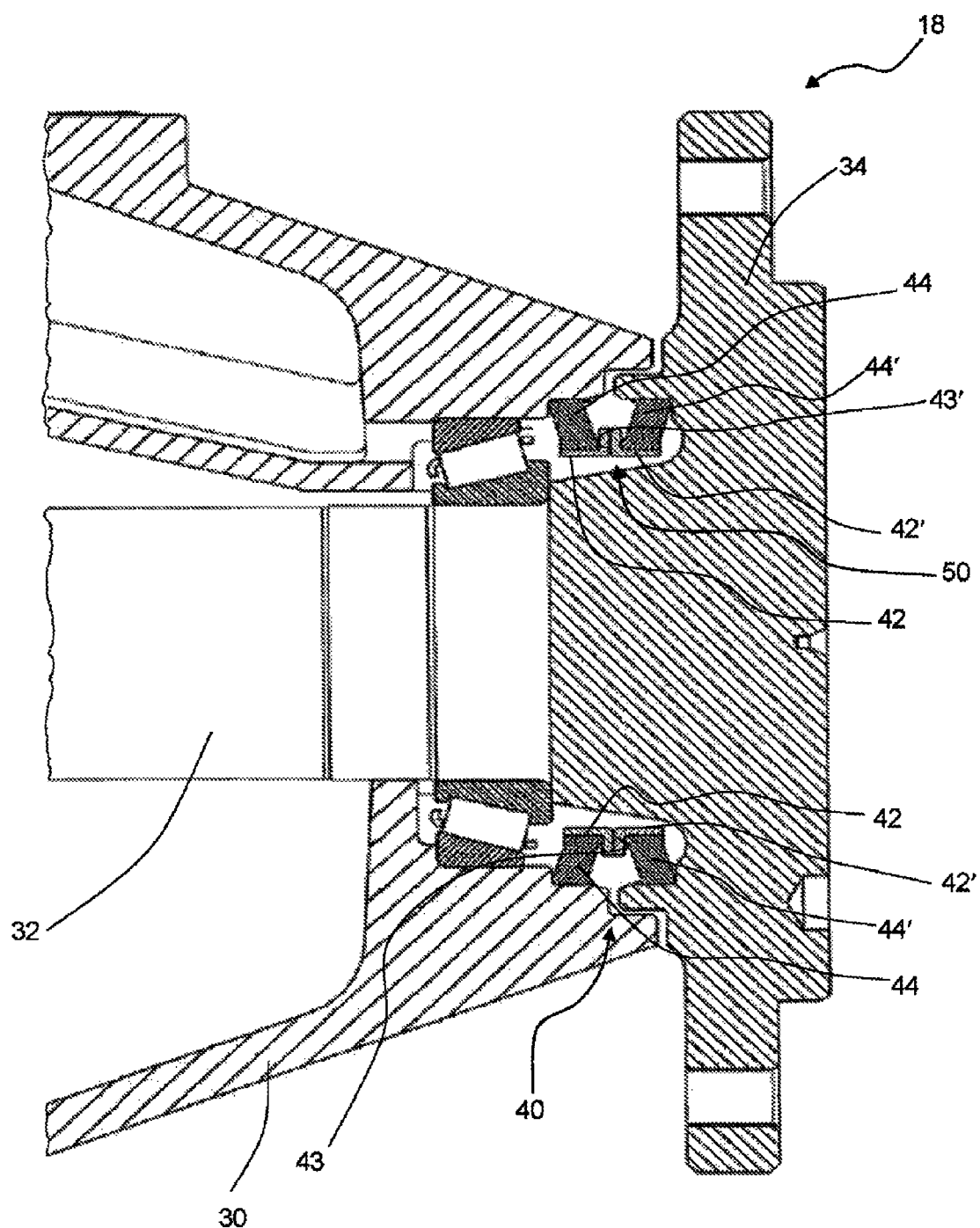
FIG. 2 is a partial cross-sectional view of the drive assembly of FIG. 1.

Referring next to FIG. 2, drive assembly 18 of motor grader 10 further includes housing 30 and axle 32. Housing 30 of drive assembly 18 is coupled, directly or indirectly, to chassis 12 (FIG. 1). Axle 32 extends through housing 30 and is rotated by motor 22 (FIG. 1). Flange 34 is located at an end of axle 32 that is opposite from chassis 12 (FIG. 1). Flange 34 may be coupled to ground engaging mechanism 20 (FIG. 1). In operation, as motor 22 rotates axle 32 relative to housing 30, ground engaging mechanism 20 coupled to flange 34 of axle 32 also rotates to propel chassis 12 across the ground.

Referring still to FIG. 2, seal 40 is provided between stationary housing 30 and rotating axle 32, specifically between housing 30 and flange 34 of axle 32. Seal 40 serves to prevent debris from entering housing 30 and lubricating fluid from leaking out of housing 30. As shown in FIG. 2, seal 40 includes two metallic sealing rings, 42, 42', and two elastomeric load rings, 44, 44', surrounding sealing rings, 42, 42'. Metallic sealing rings, 42, 42', may be constructed of nickel, a nickel alloy, iron, an iron alloy, such as stainless steel or stellite, or another suitable metal, for example. Elastomeric load rings, 44, 44', may be constructed of a nitrile polymer, a silicone polymer, or another suitable elastomer, for example. Sealing ring 42 and load ring 44 are located adjacent to stationary housing 30, while sealing ring 42' and load ring 44' are located adjacent to rotating flange 34 of axle 32. In this embodiment, as axle 32 rotates relative to housing 30, sealing ring 42' rotates against opposing sealing ring 42.

To reduce friction and scoring between metallic sealing rings, 42, 42', an assembly lubricant compound 50 may be applied to sealing rings, 42, 42'. Specifically, compound 50 may be applied to one or both contacting surfaces, 43, 43', of sealing rings, 42, 42', respectively. Compound 50 may be thick enough to reduce friction and scoring between sealing rings, 42, 42', while being thin enough to require a reasonable amount of energy to rotate sealing ring 42' against opposing sealing ring 42. An exemplary compound 50 may reduce friction and scoring between contacting surfaces, 43, 43', of metallic sealing rings, 42, 42', especially during the initial break-in or start-up of rotating axle 32. During the initial break-in of rotating axle 32, such as the first several hours of operation of motor grader 10, compound 50 may permit metallic sealing rings, 42, 42', to seat with limited wear and with limited material transfer or scoring. Seating generally involves establishing a pattern of surface mating by properly aligning contacting surfaces, 43, 43', of sealing rings, 42, 42', under a load, while scoring generally involves damaging contacting surfaces, 43, 43', of sealing rings, 42, 42', under a load, such as by transferring metal from one sealing ring 42 to the other sealing ring 42'. Although compound 50 is described herein as being applied to seal 40, compound 50 may be applied to other assemblies, seals, or moving parts of motor grader 10, including other undercarriage assemblies of motor grader 10.

Compound 50 generally includes a base oil, a viscosity index modifier, and an additive. According to an exemplary embodiment of the present disclosure, compound 50 includes less than 20% by weight of the base oil and more than approximately 5% by weight of the additive, with the viscosity index modifier making up the balance. For example, compound 50 may include approximately 15% by weight of the base oil, approximately 10% by weight of the additive, and approximately 75% by weight of the viscosity index modifier. The amount of base oil may be varied to alter the consistency of compound 50. For example, increasing the amount of base oil from 8% by weight to 15% by weight makes compound 50 less viscous and easier to apply to sealing rings, 42, 42'.

The base oil of compound 50 may include, for example, one or more of the following components: solvent-dewaxed heavy paraffinic petroleum distillates [CAS No. 64742-65-0]; hydrotreated heavy paraffinic petroleum distillates [CAS No. 64742-54-7]; hydrotreated middle petroleum distillates [CAS No. 64742-46-7]; solvent-dewaxed light paraffinic petroleum distillates [CAS No. 64742-56-9]; solvent-refined heavy paraffinic petroleum distillates [CAS No. 64741-88-4]; solvent-refined light paraffinic petroleum distillate mineral oil [CAS No. 64741-89-5]; and other suitable base oils.

The viscosity index modifier of compound 50 may stabilize the kinematic viscosity of compound 50 over various temperatures. The viscosity index modifier of compound 50 may include a polymer and base oil, for example. An exemplary viscosity modifier includes 2-Propenoic acid, 2-methyl-, dodecyl ester, polymer with methyl 2-methyl-2-propenoate ($C_{21}H_{38}O_4$) [CAS No. 30795-64-3] and base oil. More specifically, an exemplary viscosity modifier includes approximately 50 to 100% by weight of 2-Propenoic acid, 2-methyl-, dodecyl ester, polymer with methyl 2-methyl-2-propenoate ($C_{21}H_{38}O_4$) with base oil making up the balance. The base oil used in the viscosity modifier may include, for example, one or more of the following components: solvent-dewaxed heavy paraffinic petroleum distillates [CAS No. 64742-65-0]; hydrotreated heavy paraffinic petroleum distillates [CAS No. 64742-54-7]; hydrotreated middle petroleum distillates [CAS No. 64742-46-7]; solvent-dewaxed light paraffinic petroleum distillates [CAS No. 64742-56-9]; solvent-refined heavy paraffinic petroleum distillates [CAS No. 64741-88-4]; solvent-refined light paraffinic petroleum distillate mineral oil [CAS No. 64741-89-5]; and other suitable base oils.

The additive of compound 50 may encourage compound 50 to stick to sealing rings, 42, 42'. An exemplary additive is a GL-5 additive. As used herein, a "GL-5 additive" is a substance that, when added to a base oil, produces a gear oil that meets and/or exceeds performance requirements of the American Petroleum Institute's (API) Category GL-5 service. Current performance requirements for API Category GL-5 service are set forth in Standard Specification D7450-08 published by the American Society for Testing and Materials International (ASTM International) and entitled "Standard Specification for Performance of Rear Axle Gear Lubricants Intended for API Category GL-5 Service," which is attached hereto as Appendix A. Applicable test methods are also generally available from ASTM International.

An exemplary GL-5 additive includes the components set forth in Table 1 below.

TABLE 1

Composition of Exemplary Gear Oil Additive

| CAS Registry No. | Product Name | Amount (Weight %) |
|---|---|---|
| 91783-21-0 | 2,5-Pyrrolidinedione, 3-C18-24-alkenyl derivs. | 0.1-0.5 |
| 1070-03-7 | Phosphoric Acid, Mono(2-Ethylhexyl) Ester | 0.1-0.5 |
| EPA Accession #177094 | Ethoxylated lauryl alcohol-boric acid reaction product | 0.1-0.5 |
| 89347-09-1 | 1,3,4-Thiadiazole, 2,5-bis(tert-nonyldithio)- | 0.5-1.0 |
| 9003-29-6 | Butene, homopolymer | 0.5-1.0 |
| 298-07-7 | Phosphoric acid, bis(2-ethylhexyl) ester | 0.1-0.5 |
| 68955-53-3 | Amines, C12-14-tert-alkyl | 0.1-0.5 |
| 103650-99-3 | 2,5-Furandione, Dihydropolybutenyl Derivs., Reaction Products With Triethylenetetramine, Borated | 0.5-1.0 |
| 68511-50-2 | Sulphurized isobutylene | 5-10 |
| 1809-19-4 | Phosphonic Acid, Dibutyl Ester | 0.1-0.5 |
|  | Base Oil | 60-100 |

The base oil used in the GL-5 additive may include, for example, one or more of the following components: solvent-dewaxed heavy paraffinic petroleum distillates [CAS No. 64742-65-0]; hydrotreated heavy paraffinic petroleum distillates [CAS No. 64742-54-7]; hydrotreated middle petroleum distillates [CAS No. 64742-46-7]; solvent-dewaxed light paraffinic petroleum distillates [CAS No. 64742-56-9]; solvent-refined heavy paraffinic petroleum distillates [CAS No. 64741-88-4]; solvent-refined light paraffinic petroleum distillate mineral oil [CAS No. 64741-89-5]; and other suitable base oils.

Compound 50 may have a boiling point that exceeds 500° F. (260° C.). Compound 50 may have a specific gravity between approximately 0.8 and 0.9.

An exemplary method of the present disclosure involves applying compound 50 to sealing rings, 42, 42', during the initial break-in or start-up of motor grader 10, as shown in FIGS. 1 and 2. First, compound 50 is applied to sealing rings, 42, 42'. Specifically, compound 50 is applied to one or both contacting surfaces, 43, 43', of sealing rings, 42, 42', respectively. Compound 50 may have the consistency of honey such that compound 50 is spreadable yet clings onto sealing rings, 42, 42'. Next, sealing ring 42 and load ring 44 are aligned with stationary housing 30. Then, sealing ring 42' and load ring 44' are aligned with rotating axle 32. Finally, axle 32 may be manually rotated relative to housing 30 to further spread and disperse compound 50 across contacting surface 43 of sealing ring 42 and contacting surface 43' of sealing rings 42'.

EXAMPLE

An experiment was conducted to evaluate the effectiveness of various lubricant compounds during the initial break-in or start-up process. Each lubricant compound was applied to numerous seals, and the seals were tested to simulate break-in.

Compound 1 consisted of a transmission and hydraulic oil that includes approximately 79-85% by weight of a base oil, approximately 10-15% by weight of a poly-methacrylate viscosity modifier, and approximately 5-6% by weight of an additive containing zinc dialkyldithiophosphate [CAS No. 84605-29-8].

Compound 2 consisted a lubricant compound that includes approximately 8% by weight of a base oil, approximately 85% by weight of a viscosity index modifier, and approximately 7% by weight of the additive package used in Compound 1.

Compound 3 consisted of a lubricant compound, and specifically Compound 3 consisted of an exemplary compound 50 as described above. Compound 3 included approximately 15% by weight of a base oil, approximately 10% by weight of a GL-5 additive, and approximately 75% by weight of a viscosity index modifier. The base oil included hydrotreated heavy paraffinic petroleum distillates [CAS No. 64742-54-7]. The GL-5 additive had a composition as set forth in Table 1 above. The viscosity index modifier included approximately 50 to 100% by weight of 2-Propenoic acid, 2-methyl-, dodecyl ester, polymer with methyl 2-methyl-2-propenoate ($C_{21}H_{38}O_4$) [CAS No. 30795-64-3] with base oil making up the balance.

As a baseline test, approximately 2 cubic centimeters of Compound 1 was applied to each of seven seals. The metallic sealing rings of the various seals were constructed of an iron-based stellite alloy. One metallic sealing ring of each seal was immediately rotated at 200 rpm relative to an adjacent stationary metallic sealing ring of the seal. Three of the seven seals, or 43% of the seals, developed leaks within thirty minutes.

To evaluate the performance of the lubricants during break-in, approximately 2 cubic centimeters of lubricant was applied between the metallic sealing rings of each seal. Within each category, multiple seals were evaluated. The metallic sealing rings of the various seals were constructed of an iron-based stellite alloy. After the lubricant was applied, one metallic sealing ring of the seal was rotated relative to an adjacent stationary sealing ring of the seal for five minutes in each gear. Specifically, one metallic sealing ring was rotated relative to the other for five minutes at each of the following speeds: 17 rpm (first gear), 23 rpm (second gear), 33 rpm (third gear), 45 rpm (fourth gear), 68 rpm (fifth gear), 95 rpm (sixth gear), and 130 rpm (seventh gear). After simulating break-in of each seal, the sealing ring was subjected to rotation at 200 rpm for thirty minutes. The experimental results are set forth in Table 2 below.

TABLE 2

Experimental Results of Seal Break-In Testing

| Lubricant Compound | Seals That Showed Signs of Impending Score | Seals That Developed Leaks |
|---|---|---|
| Compound 1 | 89% | 11% |
| Compound 2 | Not evaluated | 20% |
| Compound 3 | 18% | 0% |

Notably, even though only 11% of the seals tested with Compound 1 failed, 89% of the seals showed signs of impending score, indicated by a rough torque trace during testing. A higher percentage of seals failed with Compound 2, the lubricant compound, than with Compound 1, the hydraulic oil. Surprisingly, none of the seals tested with Compound 3, another lubricant compound, failed, and only 18% showed signs of impending score.

While various embodiments of this invention are exemplified and described, embodiments of the present invention can be further modified within the spirit and scope of this disclosure. This application therefore covers variations, uses, or adaptations of the invention using its general principles. Further, this application covers such departures from the present disclosure as come within known or customary practice in the art to which this invention pertains and which fall within the elements of the appended claims.

What is claimed is:

1. A metal face seal including:
   a first metallic sealing ring having a first contact surface;
   a second metallic sealing ring having a second contact surface, the second contact surface of the second metallic sealing ring configured to contact the first contact surface of the first metallic sealing ring; and
   a lubricant compound located between the first metallic sealing ring and the second metallic sealing ring, the lubricant compound including:
   less than 20% by weight of a base oil;
   more than 5% by weight of a GL-5 additive; and
   a viscosity index modifier.

2. The metal face seal of claim 1, further including a first polymeric load ring at least partially surrounding the first metallic sealing ring and a second polymeric load ring at least partially surrounding the second metallic sealing ring.

3. The metal face seal of claim 1, wherein the lubricant compound includes more than 10% by weight of the base oil.

4. The metal face seal of claim 1, wherein the lubricant compound includes:
   15% by weight of the base oil;
   10% by weight of the GL-5 additive; and
   75% by weight of the viscosity index modifier.

5. The metal face seal of claim 1, wherein the base oil of the lubricant compound includes at least one of solvent-dewaxed heavy paraffinic petroleum distillates, hydrotreated heavy paraffinic petroleum distillates, hydrotreated middle petroleum distillates, solvent-dewaxed light paraffinic petroleum distillates, solvent-refined heavy paraffinic petroleum distillates, and solvent-refined light paraffinic petroleum distillate mineral oil.

6. The metal face seal of claim 1, wherein the viscosity index modifier of the lubricant compound includes more than 50% by weight of a polymer with a base oil making up a balance.

7. The metal face seal of claim 1, wherein the GL-5 additive of the lubricant compound includes sulfurized isobutylene.

8. The metal face seal of claim 1, wherein the lubricant compound has a specific gravity between approximately 0.8 and 0.9.

9. A vehicle including:
   a chassis;
   at least one ground engaging mechanism configured to support and propel the chassis;
   an axle configured to drive the at least one ground engaging mechanism;
   a housing coupled to the chassis; and
   a metal face seal positioned between the axle and the housing, the metal face seal including:

a first metallic sealing ring having a first contact surface;

a second metallic sealing ring having a second contact surface, the second contact surface of the second metallic sealing ring configured to contact the first contact surface of the first metallic sealing ring; and a lubricant compound located between the first metallic sealing ring and the second metallic sealing ring, the lubricant compound including:

less than 20% by weight of a base oil;
more than 5% by weight of a GL-5 additive; and
a viscosity index modifier.

10. The vehicle of claim 9, wherein the metal face seal further includes a first polymeric load ring at least partially surrounding the first metallic sealing ring and a second polymeric load ring at least partially surrounding the second metallic sealing ring.

11. The vehicle of claim 9, wherein the lubricant compound includes more than 10% by weight of the base oil.

12. The vehicle of claim 9, wherein the lubricant compound includes:

15% by weight of the base oil;
10% by weight of the GL-5 additive; and
75% by weight of the viscosity index modifier.

13. The vehicle of claim 9, wherein the base oil of the lubricant compound includes at least one of solvent-dewaxed heavy paraffinic petroleum distillates, hydrotreated heavy paraffinic petroleum distillates, hydrotreated middle petroleum distillates, solvent-dewaxed light paraffinic petroleum distillates, solvent-refined heavy paraffinic petroleum distillates, and solvent-refined light paraffinic petroleum distillate mineral oil.

14. The vehicle of claim 9, wherein the viscosity index modifier of the lubricant compound includes more than 50% by weight of a polymer with a base oil making up a balance.

15. The vehicle of claim 9, wherein the GL-5 additive of the lubricant compound includes sulfurized isobutylene.

16. The vehicle of claim 9, wherein the lubricant compound has a specific gravity between approximately 0.8 and 0.9.

17. An assembly lubricant compound including:

less than 20% by weight of a base oil;
more than 5% by weight of a GL-5 additive; and
a viscosity index modifier.

18. The assembly lubricant compound of claim 17, including more than 10% by weight of the base oil.

19. The assembly lubricant compound of claim 17, including:

15% by weight of the base oil;
10% by weight of the GL-5 additive; and
75% by weight of the viscosity index modifier.

20. The assembly lubricant compound of claim 17, wherein the base oil includes at least one of solvent-dewaxed heavy paraffinic petroleum distillates, hydrotreated heavy paraffinic petroleum distillates, hydrotreated middle petroleum distillates, solvent-dewaxed light paraffinic petroleum distillates, solvent-refined heavy paraffinic petroleum distillates, and solvent-refined light paraffinic petroleum distillate mineral oil.

21. The assembly lubricant compound of claim 17, wherein the viscosity index modifier includes more than 50% by weight of a polymer with a base oil making up a balance.

22. The assembly lubricant compound of claim 17, wherein the GL-5 additive includes sulfurized isobutylene.

23. The assembly lubricant compound of claim 17, wherein the assembly lubricant compound has a specific gravity between approximately 0.8 and 0.9.

* * * * *